Dec. 13, 1966   D. BATTAGLINI ET AL   3,290,978
CHART SEVERING MEANS FOR STRIP CHART TRANSPORT MECHANISM
Original Filed June 24, 1960   2 Sheets-Sheet 1
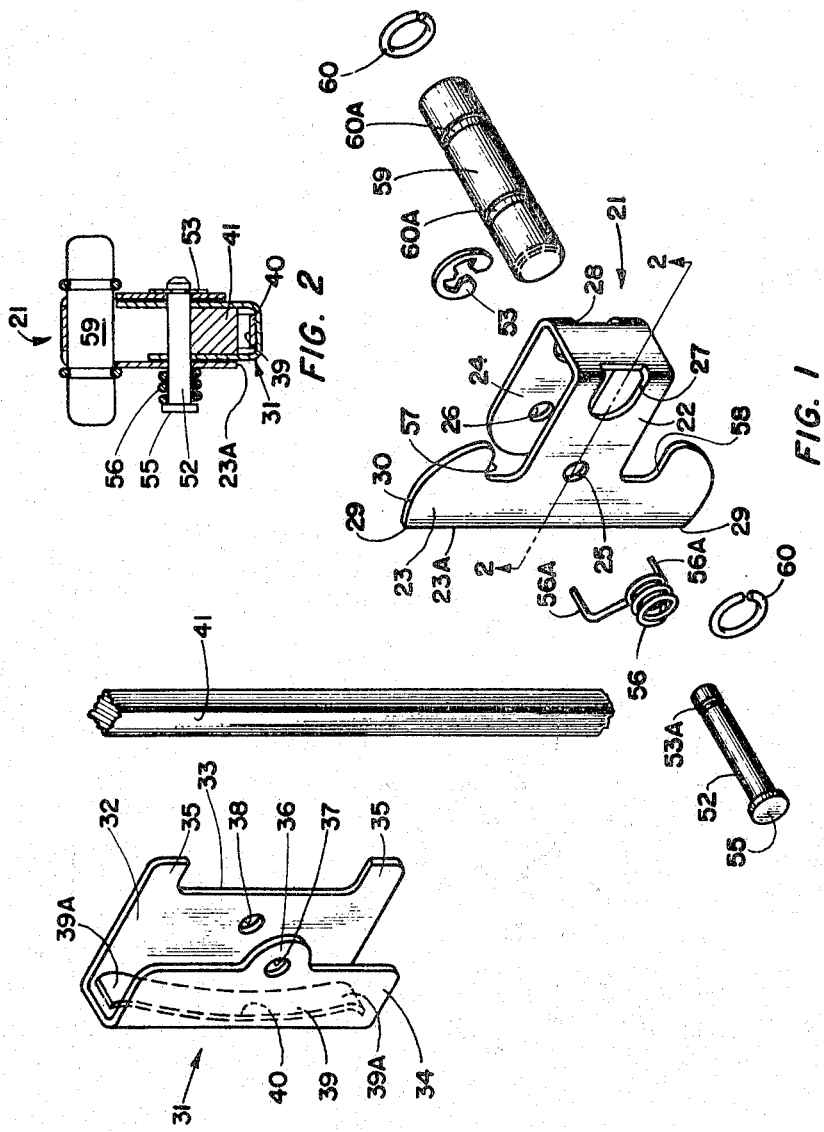

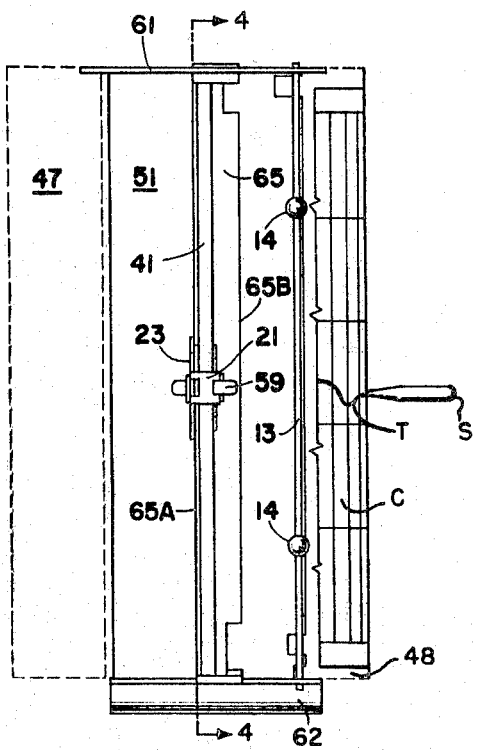
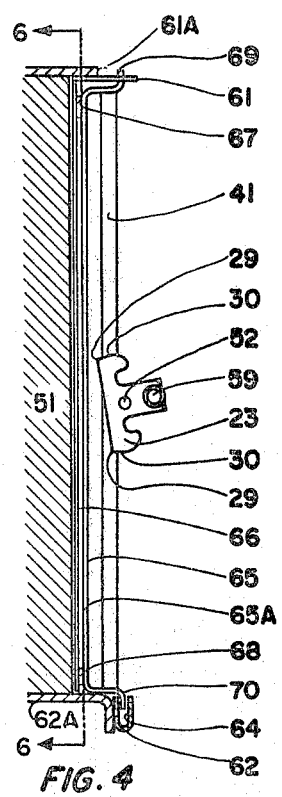
FIG. 3  FIG. 4
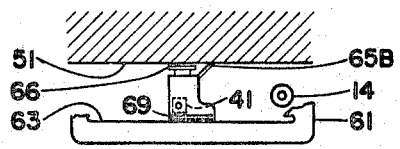
FIG. 5

United States Patent Office 3,290,978
Patented Dec. 13, 1966

3,290,978
CHART SEVERING MEANS FOR STRIP CHART
TRANSPORT MECHANISM
Domenic Battaglini, Rochester, Richard G. Beach, Greece, and Harvey A. Klumb, Pittsford, N.Y., assignors to Taylor Instrument Companies, Rochester, N.Y., a corporation of New York
Original application June 24, 1960, Ser. No. 38,495, now Patent No. 3,199,109, dated Aug. 3, 1965. Divided and this application Feb. 11, 1965, Ser. No. 462,156
2 Claims. (Cl. 83—578)

This is a division of application S.N. 38,495, filed June 24, 1960, now U.S. Letters Patent No. 3,199,109. The present invention relates to strip chart recorders, and has for its main object to provide a chart severing means and method of novel and ingenious nature.

In industrial plants, processes and the like, it is necessary to make numerous recordings of measurable variables involved in the operation of such plants, processes, etc. In U.S. Letters Patent 3,029,036, granted April 10, 1962 on the application of Harvey A. Klumb, S.N. 38,536, filed on the same date as the present application, entitled "Strip Chart Transport Mechanism," and assigned to the assignee of the present application, is disclosed a strip chart recorder so designed as to make it convenient to remove relatively small lengths of used record chart with great frequency. Specifically, the Klumb recorder is so designed that it is only necessary to sever the strip chart at the desired point and pull the marked chart out of the recorder, the recorder being so constructed that as the chart is being severed and removed, the recorder automatically continues to record and to move the free end of the remaining chart toward a rewind drum, and shortly the said rewind drum automatically picks up the new chart end and begins to rewind the remaining chart.

With such a recorder, it is necessary to sever the chart relatively neatly and cleanly, since due to the construction of the recorder, ragged or crumpled chart edges may interfere with the automatic operations above described. On the other hand, it is not easy to contrive a severing device that is at the same time simple, compact, and clean and reliable in its severing action.

One difficulty in severing chart is that, if one takes a sharp knife or razor blade and attempts to sever the chart from edge to edge by starting at one edge and going to the other edge in a direction transverse to the lengthwise moving chart, the said one edge frequently crumples before parting. After this occurs, if cutting pressure continues to be exerted, the chart usually begins to tear at points on both sides of the knife or razor edge, so that a rough-edged strip is torn out of the chart. As a result, there is developed a new free end of chart, to be picked up by the rewind drum, that may be so crumpled and/or ragged as to jam-up in the rewind drum structure as the rewind drum attempts to pick up the new free end of chart, or to cause the development of a conically-rewound roll of chart, instead of a cylindrically-rewound roll.

Another difficulty is that strip-chart recorder design, especially in the case of the so-called miniature types using three or four inch wide strip chart, strives for compactness, whereby it often results that it is difficult to get at the edges of the paper without pulling the paper out a little from the recorder structure, or to utilize a cutting mechanism parts of which lie adjacent the paper edges and outside the area between said edges, as, for example, would parts of a scissors-like device for receiving the entire paper between its blades.

The novel structure involved in our invention is compact, neat and precise in its cutting action without requiring sharpening or special attention to the matter of tolerances, and readily permits indexing along the line of movement of the chart for the purpose of choosing the time coordinate of the chart at which a cut is to be made.

In the drawings:

FIGURE 1 is a detailed exploded view of a chart severing device or cutter according to the invention;

FIGURE 2 is a median cross-section of the device of FIGURE 1 assembled relation, the view being taken in correspondence with the section line 2—2 of FIGURE 1;

FIGURE 3 is a frontal elevation of the chart severing device according to the invention in combination with the platen of a strip chart transport mechanism;

FIGURE 4 is a section taken on the line 4—4 of FIGURE 3;

FIGURE 5 is a view taken looking down on a portion of the structure shown in FIGURES 3 and 4.

In FIGURE 1, a leg 22 of a U-member 21 is formed with a roughly-rectangular blade 23, the other leg 24 of the U-member being substantially shorter than leg 22, and the surfaces of said legs being parallel to each other. Intermediate the length of leg 22 is a hole 25 and at the extremity of leg 24 is a hole 26, said holes being directly opposite one another and, conveniently, of the same size. Another pair of holes 27 and 28 are similarly arranged in legs 22 and 24 near the bight of U-member 21. The operative cutting parts of blade 23 are constituted by a pair of piercing points 29 and a pair of shearing edges 30 at the ends of blade 23.

A second U-member 31 has a leg 32 notched out at 33 to define stops 35 at either end of the broad side of the extremity of leg 32. The other leg 34 of U-member 31 is somewhat shorter than leg 32, the extremity thereof being formed as an ear 36 of less width than the other parts of U-member 31. Both said legs of U-member 31 have their broad surfaces parallel, and holes 37 and 38 are provided therein, the former in ear 36, and the latter directly opposite in the intermediate portion of leg 32. A bow spring 39 is provided inside U-member 31 and has its bight fixed to the bight of the U-member 31, as by spot welding at 40, the said spring being positioned so that its ends 39A generally project away from the bight of the U-member 31 and in the direction of the ends of legs 32 and 34.

In assembled relation (see FIG. 2), U-member 31 is received between the legs of U-member 21, with holes 37 and 38 registering with holes 25 and 26, and with a pin 52 passing through the said holes, there being an enlarged head 55 on pin 52 and an annular groove 53A in the pin, which groove receives a C-washer 53, whereby the hold U-members 21 and 31 in assembled relation.

Between the ends of bow spring 39 and pin 52 passes a square-cross section, straight guide bar 41, said bar being of such proportions that it flattens out bow spring 39 so as to cause U-member 21 and 31 to fit snugly about the bar and form a knife or cutter assembly frictionally prevented from sliding along the bar and constrained to move in a straight line direction, if forced to move along the bar.

The said knife assembly is completed by a coil spring 56 having a few turns looped about pin 52 between head 55 and leg 22, the ends 56A of spring 56 being hooked over the back of blade 23 in a pair of notches 57 and 58, at the back of blade 23, and over the outer end of leg 34 on either side of ear 36. Said spring 56 is a sufficient stiffness that if U-member 21 is pivoted about pin 52, from a position in which bottom edge 23A of knife 23 is substantially parallel to guide bar 41, spring 56 stores up enough stress to return U-member 21 to said position if the force applied to pivot U-member 21 is removed and U-member 21 is released.

Holes 27 and 28 receive a pin 59 having annular grooves 60A thereon for receiving split rings 60 therein, in order to secure pin 59 in place and at the same time, to permit pin 59 to turn in holes 27 and 28. The ends of pin 59 project far enough from the sides of U-member 21 as to be conveniently grasped between thumb and forefinger for simultaneously sliding the assembly of U-members along guide bar 41, and deflecting the U-member 21 about pin 52, whereby if the said assembly is slid along bar 41, one of points 29 will simultaneously project considerably beyond guide bar 41 and move parallel thereto. The rotatability of pin 59 insures that an overly-firm grip on its ends will not force the knife assembly to move along guide bar 41 without deflection of U-member 21.

In FIGURES 3 and 4, the knife assembly of FIGURES 1 and 2 is shown in combination with a platen 51, which may be the platen of a strip chart transport mechanism of the type shown in the prior copending application of Harvey A. Klumb et al., S.N. 749,988, filed July 21, 1958, now U.S. Letters Patent 3,044,069, granted July 10, 1962, or of the type shown in the afore-mentioned copending application of Harvey A. Klumb, filed on the same date as this application, the present invention being particularly intended for use with the chart drive mechanism of the second-mentioned application. Nevertheless, our invention has general utility, since functionally speaking, all our chart cutting mechanism requires of a chart transport mechanism is that the latter support the portion of chart to be cut adjacent the cutting assembly so that the blade thereof can cut into said chart portion.

In order to avoid complicating FIGURES 3 and 4, the knife assembly is represented only by the U-member 21 including its blade portion 23 and pins 52 and 59. In practice, of course, all the parts shown in FIGURE 1 will be assembled on guide bar 41 in the manner indicated by FIGURE 2. Likewise, the chart transport mechanism is represented only by platen 51 and, in dotted outline, a drive drum 48 and a rewind drum 47.

The recording mechanism as such, in addition to the said transport mechanism, is characterized by a stylus means S, which would be the stylus 9 of the aforesaid Klumb application, or, as well, the stylus 66 of the aforesaid Klumb et al. application, or, again, the pen, pencil, or other marking element of whatever strip chart recorder be used. No instrumentality for causing stylus means S to perform its marking function is shown, for such instrumentalities are many and varied, and their particular nature and integration with the recording mechanism are not of concern here. A portion of chart coming off drive drum 48 and heading toward the platen 51 is indicated by reference character C, in FIGURE 3, and a trace T, such as would be made by a typical stylus, is illustrated thereon.

As is evident from FIGURES 3 and 4, providing the aforementioned strip chart mechanism with our novel severing means requires no modification of the original transport mechanism but the simple addition of a pair of guides 61 and 62 having slots 63 and 64 therein (see FIGURES 4 and 5) for the purpose of receiving the extremities of a knife assembly carriage including guide bar 41, said guides 61 and 62 being fixed to the extremities of platen 51 by any suitable means such as spot welds, or the like. Slots 63 and 64 run parallel to platen 51, which latter should be flat and smooth to provide a good writing surface for annotating strip chart passing thereacross.

Guide bar 41, a shear plate 65, a strip 66 and a pair of spacing discs 67 and 68 constitute the aforesaid knife or cutter assembly carriage, the ends of shear plate 65 being bent as shown to provide a pair of guide tabs 69 and 70 (FIGURE 4) and to accommodate guide bar 41, the ends of which are fixed to the ends of plate 65 by any suitable means (not shown). Plate 65 and strip 66 are secured together with discs 67 and 68, as by spot welding the opposite sides of said discs to said plate and strip. Strip 66, shear plate 65 and platen 51 are arranged so that their surfaces are parallel to each other, and guide bar 41 is so arranged that the knife assembly travels parallel to platen 51 and normal to the direction of strip chart motion across the platen 51, which motion would be from right to left, looking at FIGURE 3, and so that the plane in which U-member 21 deflects about pin 52 is normal to the platen surface. The left front edge 65A of shear plate 65, which is straight and arranged just slightly to the right of said plane and parallel thereto, is also arranged parallel to guide bar 41 with close enough spacing therefrom that if U-member 21 be deflected, the blade 23 crosses said left edge of plate 65 with a sort of scissors-like action and begins a cut in the chart (not shown).

It will be noted, however, that unlike the usual scissors action, the chart is first pierced by one of the points 29, whereupon the bottom edge 23A of blade 23 and one of the edges 30 of blade 23 then shear the chart at both sides of the said one of corners 29 and, subsequently, if the first-mentioned knife assembly is moved along guide bar 41, the said one of the edges 30 does all the shearing until one chart edge is reached and sheared through, at which point the assembly movement may be reversed. Upon reversal of such movement, U-member 21 tilts so as to cause the other of said points 29 to cross the left edge 65A of shear plate 65, so that when the knife assembly reaches the other limit of its travel the other edge 30 of blade 23 will have sheared the chart to and through its other margin.

It is obvious, therefore, that if strip chart is passing across platen 51 and between guide bar 41 and plate 65, and if the ends of pin 59 are grasped between thumb and forefinger, and if the knife assembly is held thus and forced to travel along guide bar 41, one of the points 29 will be forced into said strip chart, and the strip chart will experience a shearing stress as the knife assembly is thus moved.

It will be noted that if the knife assembly is thus moved, that point 29 which is nearest the strip chart margin toward which the assembly moves, is forced into the paper.

Hence, by arranging that the drag on the knife carriage, due to bow spring 39, be only enough to cause U-member 21 to deflect when acted upon by hand as aforesaid to move the knife assembly along guide bar 41, it is obvious that a quick up and down motion of the hand will result in a clean, straight and complete cut of the strip chart before it has a chance to move in the time direction appreciably relative to the left edge 65A of shear plate 65.

Neither spring 39 nor spring 56 are essential to the cutting action, since a person using the cutting assembly could take the trouble to see that U-member 21 takes the proper position. Nevertheless, the spring 39 practically automatically assures the creation of a force couple on U-member 21 sufficient to drive a point 29 into the strip chart, and spring 56 keeps blade 23 positioned so that both of points 29 clear the chart except when the knife assembly is being moved to cut the chart.

The function of shear plate 65 is to support the chart spaced from the platen 51 and close enough to the points of cutting so that, with the chart tension generated by the rewinding action of the chart transport mechanism, enough reaction in the chart to blade 23 is created that the blade pierces and shears the chart. If the chart is dry and the points 29 are sharp or square, as opposed to blunt or rounded, the spacing between the left edge of shear plate 65 and the points 29 of blade 23 can vary widely without adversely affecting the reliability of the cutting action, provided the chart is kept under a few grams tension.

If the chart is slack or limp, as it would be under conditions of high humidity, the spacing between the left-hand front edge 65A of shear plate 65 and points 29 becomes somewhat critical. If the limpness of the chart is due to the absorption of moisture by the paper of which the chart is composed, and if the spacing between blade 23 and the left front edge 65A of shear plate 65 is about or less than chart thickness, it appears that the chart may stick between blade 23 and shear plate 65 as the blade traverses the left edge of shear plate 65. Hence, under such circumstances, attempted cutting results in tearing uneven chunks out of the chart, and creating tatters and crumples in the free end of chart being developed by cutting.

If, on the other hand (with a damp chart) the spacing between edge 65A and blade 23 is too large, the blade 23 instead of shearing the damp chart, deforms the chart without cutting it completely or at all, as the blade 23 is traversed across the chart. In this instance, it appears that damp chart can stretch appreciably whereby if it is not supported by shear plate 65 close enough to the blade 23, it gives sufficiently before the thrust of blade 23 to deform without shearing.

We have found that with chart of two or three thousandths of an inch thickness, that a spacing of about sixteen thousandths of an inch is a nominal optimum spacing, although this optimum spacing can deviate in a range of about twelve- to twenty-thousandths of an inch and still permit reliable cutting action under both dry and moist conditions of the chart.

The neatness, or cleanness, of the cutting action depends on the sharpness of the edges 30. In practice, anything from a razor blade to a pencil point could be used to sever the chart by shearing it against the shear plate 65. Naturally, razor blades and things of that ilk would give smooth cuts, whereas pencil points and the like would give rather rough cuts.

According to the invention, and as opposed to the conventional sharpness of razor blades and the like, the sharpness of edges of blade 23 is provided by burring the edges 30. For example, the U-member 21 may be die-stamped out of flat sheet metal and bent into shape. As is well known, stamped parts tend to be slightly rounded at the edges thereof developed at the points of entry of the die into the metal, and burred at the edges thereof developed at the points of exit of the shearing elements of the die from the metal. In this case, the burred edges will be found to be the operative cutting edges.

It will also be found that if the burrs on the edges of blade 23 are removed, as by tumbling batches of newly formed U-members 21 together, that the resultant blunting and smoothing of edges will sometimes cause cutting difficulties under critical cutting conditions such as high humidity (although if the burrs due to stamping are filed away, apparently the minute burrs left by filing give the blade 23 a good, reliable cutting characteristic). Hence, if the blades 23 are formed by stamping, they should not be tumbled or otherwise treated to remove burrs and leave smooth and more or less rounded cutting edges. In this connection, it will be observed, that the drawings imply that the operative edges 30 are those next adjacent the left edge 65A of shear plate 65. However, it is found that, using stamped blades, that the burred edges thereof may be located on either side of blade 23 with no effect on the cutting action. The reason for this is that shear plate 65 merely supports the chart, while blade 23 does all the actual shearing. It is accordingly obvious that the sharpness of the left edge 65A, i.e., that edge thereof on which the chart rests is of little moment.

Another fact to be considered is the angle made by an edge 30 with the chart, where U-member 21 is in a tilted position with a corner 29 pierced through the chart. The said angle is conveniently chosen to be 45° as a compromise. It is obvious that the maximum concentration of shearing stress would be exerted on the chart if the edge 30 were normal to the unbroken surface of chart next the hole therein started in the chart. However, since the edges 30 of blade 23 are more or less flat or blunt, it is possible to tear out tatters or strips under highly humid chart conditions, if the angle between an edge 30 and the chart is too large.

On the other hand, if the said angle is small, the corners 29 may be too obtuse, in effect, to insure piercing the chart, and the deformation of the chart by the edges 30 may be too small to succeed in causing the paper to exceed its limit of stretching and part, as an edge 30 traverses the chart.

Although a shearing angle of 45° between chart and an edge 30 insures a neat and effective shearing action, this angle is not critical, but may be deviated from, preferably on the steep side. In the example shown, stops 35 prevent the edges 30 from forming a too-small angle with the chart when the cutting mechanism is in operation.

Superficially, the cutting action if our invention has the appearance of being scissors-like. However, a true scissors would be somewhat bulky since the shearing parts thereof would have to lie in part outside of the chart area and quite close to the platen. A true scissors, too, would be expensive, since in order to cut reliably, whether from an edge inward, or outward toward an edge, the shearing edges would have to be quite sharp and substantially tangent to each other at all points, and would probably require maintenance to keep them in that condition.

Our cutter is not a scissors, however, since the blade 23 need not (and preferably does not), as scissors would, slide relative to and in contact or very nearly so with edge 65A of shear plate 65, and therefore poses no problems of forming, sharpening, assembling and maintenance. All the sharpening that blade 23 needs is a by-product of the process of forming it by stamping, and its original state of sharpness needs no maintenance. Our cutting device is small and, in use, does not need to pass beyond the confines of the chart edges except for that hair's breadth of motion necessary to break through the chart edges at the limits of the cutting stroke.

It is not possible to specify exactly the necessary sharpness for points 29 and edges 30, although it seems that for reliable chart cutting under a wide range of humidity conditions, that both points 29 and edges 30 should be more or less square, or even acute, but not substantially obtuse.

It will be recalled, in the later of the aforesaid copending applications, that a rod 13 having spherical elements 14 thereon is provided to assist in guiding and holding down the free end of chart. In the present case, said rod may be retained, supported between guides 61 and 62. However, since a chart free end between shear plate 65 and rod 13 must cross shear plate 65 and thread between shear plate 65 and guide bar 41, it is convenient to provide shear plate 65 with a trailing edge 65B merging with the surface of plate 51, in effect, so as to present substantially no obstruction to feeding a free end of chart under rod 13 and between guide 41 and shear plate 65, as when starting a new roll of chart. This arrangement is shown in FIGURE 5, which also illustrates the relation of platen 51, strip 66, guide bar 41, rod 13 and shear plate 65 as seen from the top of platen 51 looking down along the length thereof.

The ends of shear plate 65, described above as tabs 69 and 70 are received in slots 63 and 64 of guides 61 and 62, hence, the aforesaid knife assembly carriage, i.e., shear plate 65, guide bar 41 and strip 66 can be indexed as whole back and forth across platen 51, whereby it is possible to sever the strip chart along any time coordinate of the chart over the major portion of platen 51, as more particularly described in the aforesaid application S.N. 38,495.

While the drawings as a whole follow closely our invention as it is practiced in commercial use, for clarity, FIGURES 1 and 2 are drawn far more than life-size. Likewise for clarity, clearance between parts and weight of material are shown larger than they are in practice. For example, in FIGURE 4, plate 65 and strip 66 need be spaced no further than two or three thicknesses of the few thousandths diameter cord 71, and all in all, the assembly of bar 41, guides 61 and 62, strip 66 and plate 65 would be compressed in its lateral dimension to half or less that indicated in FIGURE 4, taking the length of platen shown as representative of an actual case. Such matters of dimensioning will present no difficulty to one skilled in the art, and do not materially effect the principles of our invention.

The foregoing is a complete account of our invention including a detailed description of the construction and manner of use of the best form of the invention thus far known to us. However, we believe that the scope of our invention transcends the narrow limits of specific structure disclosed herein, and have drafted the claims appended hereto accordingly.

We claim:

1. In a sheet material severing device of the type having a flat blade and means mounting said blade for motion in its plane along a guide extending over the surface of sheet material to be severed, and wherein said blade has a pair of intersecting edges and said means is operable to position said blade so that said edges both intersect the plane of said sheet material as said blade moves along the said guide, the improvement wherein one of said intersecting edges is a square-edged surface, a square edge of which whose length extends along the said plane and said square edge is burred along its said length; the width of said square-edged surface being the thickness of said blade.

2. The invention of claim 1, wherein the other of said intersecting edges is a square-edged surface, a square edge of which whose length extends along the said plane, said other of said square edges being burred along its length and the width of the last said square-edged surface being the thickness of said blade.

References Cited by the Examiner

UNITED STATES PATENTS

| | | | |
|---|---|---|---|
| Re 10,166 | 10/1953 | Wheeler | 83—52 |
| 943,221 | 12/1909 | Engberg | 83—614 X |
| 1,215,388 | 2/1917 | Lanford | 83—614 |
| 1,624,590 | 4/1927 | Fleming | 83—912 X |
| 1,745,476 | 2/1930 | Cohn | 83—175 |
| 1,992,962 | 3/1935 | Murch | 83—52 |
| 2,344,372 | 3/1944 | Sikstrom | 83—614 |
| 2,393,384 | 1/1946 | Kress | 83—614 |
| 2,665,757 | 1/1954 | Stevens | 83—358 X |
| 2,672,933 | 3/1954 | Bridy | 83—578 |
| 2,927,835 | 3/1960 | Virbila | 346—24 |

FOREIGN PATENTS 944,122   12/1963   Great Britain.

WILLIAM W. DYER, Jr., *Primary Examiner.*

J. M. MEISTER, *Assistant Examiner.*